UNITED STATES PATENT OFFICE.

MAX ULRICH SCHOOP, OF BOIS COLOMBES, FRANCE.

FLUX FOR THE AUTOGENOUS WELDING OF ALUMINUM.

No. 922,523.

Specification of Letters Patent.

Patented May 25, 1909.

Application filed February 25, 1907. Serial No. 359,070.

*To all whom it may concern:*

Be it known that I, MAX ULRICH SCHOOP, a citizen of the Republic of Switzerland, and a resident of Bois Colombes, Seine, France, have invented a new and Improved Flux for the Autogenous Welding of Aluminum, of which the following is a full, clear, and exact description.

It is well known that many metals, such as iron, platinum, copper and the like, can be autogenously soldered (that is, welded without the use of any foreign metals) by means of the blow pipe, but up to the present time all attempts to weld aluminum in this manner have failed. At the high temperature which must necessarily be employed, a skin or film of oxid forms on the surface of the aluminum to be soldered and this film despite its extreme thinness prevents the fused edge or surface of one piece from uniting with the fused edge or surface of the other piece.

Various processes have been disclosed and patented for uniting aluminum to aluminum, but all have so far proved impracticable. Aluminum soldering by the use of a different metal, such as zinc, tin, or other metal or alloys having a lower melting point than that of aluminum, is old, but a practical soldering by this method cannot be attained on account of the electrolytic action which is set up between the aluminum and the soldering metal particularly in the presence of water. This electrolytic action can be completely avoided only by eliminating all foreign metals from the soldering compound.

According to the present invention, it is possible to weld aluminum in the form of castings, sheets, plates, wires, or the like, by means of a suitable blow pipe flame and by means of a flux, preferably in the liquid state, which is capable of reducing the layers of aluminum oxid which are formed. The deoxidizing substance may vary in composition, and as a general rule must be modified to suit the particular pieces of aluminum to be soldered and the particular flame employed. So far as the flame is concerned, it is convenient to employ oxy-acetylene flame or a flame fed by oxygen and ordinary illuminating gas. As reducing agents, I preferably employ alkali chlorids to which a certain percentage of lithium chlorid has been added to lower the fusing point, and by the use of this welding compound and the welding blow pipe flame, it is possible to weld the fused aluminum very readily. In employing the oxy-acetylene blow pipe, it is desirable to use a mixture by weight of Potassium chlorid ......... 60 parts
Sodium chlorid ............ 12 parts
Potassium bisulfate ........ 4 parts
Lithium chlorid ........... 20 parts This mixture is preferably fused in a platinum dish, then crushed in a mortar and sufficient water added to form a thin paste. If a blow pipe flame of lower temperature than that produced by the oxy-acetylene flame be employed, such for instance, as that produced by oxygen and illuminating gas, or oxygen and hydrogen, it is desirable to increase the proportion of potassium bisulfate in order to lower the point of fusion of the mixture.

The action of the compound mentioned is dual; firstly, its effect is that of dissolving the aluminum or thin films of aluminum oxid that are formed; and, secondly, it protects the hot metallic surfaces from the air, so that in this respect it plays a part analogous to that of borax in ordinary soldering operations, and what is of importance is, that, the melting point of the flux is near the melting point of aluminum. In carrying out the process in actual practice, the dissolving substance is applied to the surface to be soldered in the form of a paste or a powder and the surfaces are heated by means of a blow pipe until they are fused, immediately after which the fusion of the aluminum itself commences, the melting point of the flux being slightly below that of the aluminum.

Pieces of aluminum welded according to my improved process become as firmly fused as though they had been originally formed from a single piece of metal, and the welded points possess the same characteristics in regard to their chemical and physical properties as does the pure aluminum, as has been proven from micro-photographic studies of such welds. Furthermore, not even the slightest trace of impurities resulting from the flux can be determined. The soldered or welded points may be exposed to the action of water or even to sea water for months and no injurious effects of any kind will be produced, as the absence of any foreign metal prevents electrolytic action from being set up.

In the welding of aluminum in accordance with my invention, it makes little difference whether or not the parts to be joined are directly welded one to the other, or whether pure aluminum is applied to the welding joint. If the parts to be joined do not unite evenly, separate pieces of metal in the form of wire or thin sheets may be inserted at the desired points and a perfectly welded joint be obtained.

As the chief essential of my process consists in the dissolution of the aluminum oxid at the time the aluminum is heated and fused, it is evident that I may employ it in melting together and purifying of scrap aluminum.

I claim:—

1. A flux for welding aluminum, including a chlorid and a bisulfate.

2. A flux for welding aluminum, containing an alkaline chlorid and an alkaline bisulfate.

3. A flux for welding aluminum, consisting of chlorids of a plurality of alkali metals and bisulfate of potassium.

4. A flux for welding aluminum, consisting of the chlorids of a plurality of alkali metals, one of which is lithium and bisulfate of potassium.

5. A flux for welding aluminum, consisting of chlorid of potassium, chlorid of sodium, bisulfate of potassium, and chlorid of lithium.

6. A flux for welding aluminum, consisting of a chlorid of potassium, sixty parts, chlorid of sodium, twelve parts, bisulfate of potassium, four parts, and chlorid of lithium, twenty parts.

7. A flux for welding aluminum, containing haloid salts of alkali metals and a bisulfate fused together.

8. A flux for welding aluminum, comprising haloid salts of alkali metals and bisulfate of potash fused together, ground and mixed to a paste.

9. A flux for welding aluminum containing a haloid salt of an alkaline metal and a bi-sulfite fused together.

10. The method of making a welding compound which comprises mixing together haloid salts of alkali metals and a sulfate of an alkaline earth metal in proportions to render the fusibility of the flux slightly below the fusing point of aluminum and fusing the mixture.

11. The method of making a welding compound which comprises mixing together haloid salts of alkali metals and a salt of a metal of the alkaline earth in proportions to render the fusibility of the flux slightly below the fusing point of aluminum, fusing the mixture, comminuting it and mixing it to a paste.

In testimony whereof I have signed my name to this specification in the presence of two subscribing witnesses.

MAX ULRICH SCHOOP.

Witnesses:
CLAIR W. FAIRBANK,
EVERARD B. MARSHALL.